United States Patent Office 3,849,554
Patented Nov. 19, 1974

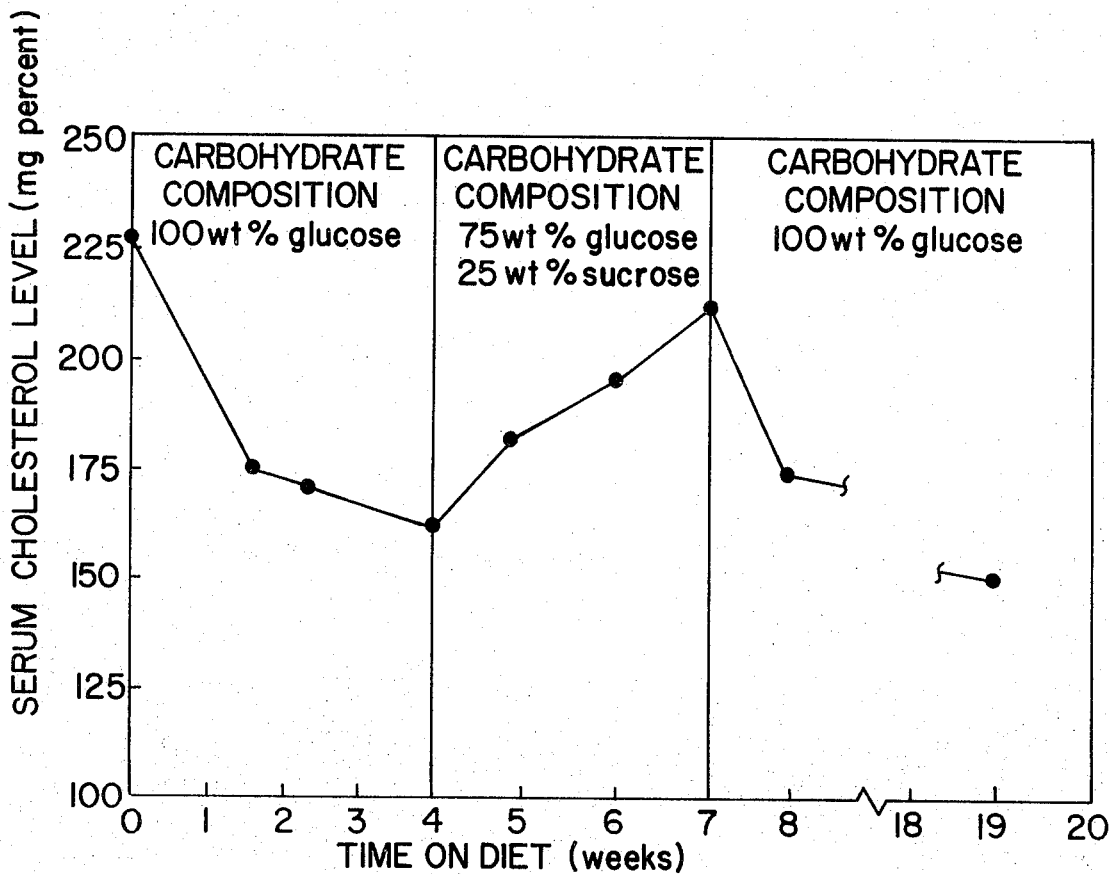

3,849,554
REDUCTION OF BLOOD SERUM CHOLESTEROL
Milton Winitz, Palo Alto, Calif., assignor to the United States of America as represented by the Administrator of the National Aeronautics and Space Administration
Continuation-in-part of abandoned application Ser. No. 510,778, Dec. 1, 1965. This application July 28, 1969, Ser. No. 847,815
Int. Cl. A61k 27/00
U.S. Cl. 424—180
8 Claims

ABSTRACT OF THE DISCLOSURE

By feeding a human subject as the sole source of sustenance a defined diet wherein the carbohydrate consists substantially entirely of glucose, maltose or a polysaccharide of glucose, the blood serum cholesterol level of the human subject is substantially reduced. If 25 percent of the carbohydrate is subsequently supplied in the form of sucrose, an immediate increase from the reduced level is observed. The remainder of the defined diet normally includes a source of amino acids, such as protein or a protein hydrolysate, vitamins, minerals and a source of essential fatty acid.

---

This application is a continuation-in-part of my earlier application, Ser. No. 510,778, filed Dec. 1, 1965, now abandoned.

This invention relates to the reduction of blood serum cholesterol levels and more particularly to the reduction of serum cholesterol levels by controlling the specific type of carbohydrate ingested by a subject.

High serum cholesterol levels have been considered to be a possible causative factor in cardiovascular diseases such as atherosclerosis. Accordingly, various attempts have been made to lower the blood serum cholesterol levels. These previous attempts have concentrated primarily on limiting the dietary fat intake of the patient, or upon the use of various chemotherapeutic agents and drugs.

Carbohydrates in a typical dietary regimen are provided in the form of starches, which are high molecular-weight and relatively water-insoluble polymers of glucose. Other sources of carbohydrate, such as lactose (a disaccharide of fructose and glucose), as well as monosaccharides, such as fructose and glucose, occur in natural dietary regimens, but to a much more limited extent. The carbohydrates are employed by the animal organism as a prime source of energy. Prior to utilization by the animal organism, the polymeric or dimeric forms of the carbohydrates are degraded to the constituent monomers by enzymatic action in the gastrointestinal tract in order that they may be absorbed through the gastrointestinal tract.

It is an object of this invention to provide a method for reducing blood serum cholesterol levels.

It is another object of this invention to provide a method for reducing the blood serum cholesterol level by controlling the kind of carbohydrate in the diet of the subject.

It is another object of this invention to provide a novel diet formulation which is suitable for use in reducing blood serum cholesterol levels.

These and other objects of this invention will be readily apparent from the following detailed description when read in conjunction with the accompanying drawing wherein FIG. 1 is a graphical representation of the results obtained from one series of experiments according to this invention.

It has been unexpectedly found that blood serum cholesterol levels of subjects confined to defined diets can be substantially reduced by the appropriate selection of the carbohydrate component of the diet. It has been found that when glucose is the carbohydrate component of such diets, either in the mono, di, or polysaccharide form, marked reductions in the blood serum cholesterol level occurs. Of course, only glucose polysaccharides which metabolize, such as starches and dextrins, would be used. When other carbohydrates, such as sucrose for example, are substituted for glucose, blood serum cholesterol levels increase. This result is observed even though no change is made in the composition or concentration of any of the other components of the diet.

As used in this patent application, the term "defined diet" refers to a diet formulation consisting essentially of highly purified nutrients. If the nutrients of the defined diet are all present in the form of compounds whose precise molecular configuration is known, this defined diet is termed a "chemically defined diet." Nutrients whose precise molecular configuration may not be known and whose inclusion would remove the diet from the chemically-defined-diet category, include, for example, proteins, peptones, starches, dextrins and fats. On the other hand, nutrients whose molecular configurations are precisely known and may be a part of chemically defined diets include, for example, amino acids and their simple precursors, such as purified peptides, mono- and disaccharides and esters of pure fatty acids.

Diets for human consumption should supply all of the requirements of the essential amino acids and nitrogen needed for growth and sustenance of normal physiological activity. There is also a requirement for essential fatty acid which is relatively low in necessary amount. Nutritionally adequate diet formulations will provide a source of amino acids, fats, minerals, vitamins and a source of calories generally in the form of carbohydrates.

Proteins are high molecular weight, highly complex polymers composed of a variety of the so-called essential and non-essential amino acids. Utilization of protein by the animal organism requires that the protein be degraded by the proteolytic enzymes of the gastrointestinal tract to the constituent individual amino acids because the amino acids can be absorbed through the gastrointestinal tract only in the free, uncombined form. The essential amino acids, of which there are considered to be ten in number (leucine, isoleucine, valine, methionine, tryptophan, phenylalanine, threonine, arginine, lysine and histidine), are a vital requirement of the animal species. For a dietary regimen to be considered adequate for the support of all normal physiological functions, it should contain these essential amino acids in the appropriate levels and in the proper proportion of one to the other. The function of the non-essential amino acids is to provide a source of metabolizable nitrogen required by the animal organism for the biosynthesis of proteins, purines, nucleic acids, and other metabolites. Examples of the non-essential amino acids include alanine, glycine, proline, glutamic acid, aspartic acid, and serine. Proper nutritional balance requires that these non-essential amino acids be provided in sufficient quantity and within a range of proportions to each other that is less restrictive or critical than the balance required for the essential amino acids. As used in this application, the term "amino acid" or "free amino acid" or the named amino acid should be understood to also include the simple reaction product of the amino acid and another chemical compound (for example, esters, amides and salts of amino acids) in which form the amino acids may also be employed without detracting from their nutritional utilization.

In chemically defined diets, the amino acid components, in the form of free essential and non-essential amino acids or suitable precursors thereof, such as purified peptides, are provided at total levels sufficient to satisfy normal physiological requirements for nitrogen, Accordingly, the balance among the various amino acids is selected to meet the normal metabolic needs of the human subject and to maintain the desired nitrogen balance. Because of strong interdependencies between the required level of a given amino acid and the level of one or more of the other amino acids present in the diet, it is not practicable to establish a precise range of levels for each of the amino acids. Generally, the ratios of the levels of amino acids in the diets should approximate those of a high quality protein, such as meat, eggs, or milk, for example.

The amino acid content of such materials is set forth in "Amino Acids Content of Foods," M. L. Orr and B. K. Watt, Home Economics Research Report No. 4, Agricultural Research Service, U.S. Dept. of Agriculture, December 1957, available from the Superintendent of Documents, U.S. Government Printing Office. A useful guide in determining minimum protein and amino acid requirements for formulating diets other than those specifically disclosed herein is found in "Protein Requirements," Report of the FAO Committee, Rome, Italy, 24–31 October, Food and Agricultural Organization of the United Nations (1957), available from Columbia University Press.

The present invention is not limited to chemically defined diets but is intended to include the employment, as a source of amino acids, appropriate substances will be converted to free amino acids by the metabolic processes of the human body. Suitable proteins, such as casein or lactalbumin for example, may be employed as the source of amino acids. Likewise, protein hydrolysates and peptones from high quality proteins, such as soy protein, casein, lactalbumin, fish protein, and gelatin for example, may also be used in a diet formulation designed to have the effect of lowering blood serum cholesterol levels.

Lipids typically appear in a natural dietary regime as fats and oils in the form of triglycerides of three molecules of fatty acids in combination with one molecule of glycerol. The common fatty acids in such triglycerides are those having between 12 and 24 carbon atoms, such as palmitic, stearic, myristic, oleic, linoleic, linolenic, and arachidonic acids. Of these, only linoleic, linolenic, and arachidonic acids have been found to be essential to normal physiological function of animal organisms. The essential fat or fatty acid requirement can be satisfied either by sufficient quantities of linoleic or arachidonic acids, or by combinations of the two, or by linolenic acid in combination with sufficient quantities of either or both of the other two. Degradation of fats prior to absorption through the gastrointestinal tract is accomplished by the enzymatic action of the lipases of the gastrointestinal tract, through which enzymatic action free fatty acids are formed. A discussion of the essential fatty acid requirements appears in Chapter 7 of the publication entitled *The Vitamins*, W. H. Sebrell and R. S. Harris, Academic Press, Inc., New York (1954) and also in a 1968 publication of The National Academy of Sciences, Washington, D.C., entitled *Recommended Dietary Allowances*. Other than the essential fatty acids for which there is a vital requirement by the body, fats, like carbohydrates, serve as a source of energy.

The fat component of the diet composition may be a fat, i.e., a glycerol ester of a fatty acid having between 12 and 24 carbon atoms, or a fat substitute, such as a simple alkyl ester of a fatty acid having between 12 and 24 carbon atoms, the alkyl group having 6 or less carbon atoms, for example, ethyl linoleate. The fat component is maintained at levels sufficient to meet the needs of normal physiological function. A purified naturally occuring fat such as purified safflower oil or corn oil can be used. It has been observed that a level of fat as low as 0.2 percent by weight (solids basis) of an otherwise adequate defined diet is sufficient to maintain normal health over an extended period of time. Although greater amounts of fat can be used, the fat component is prefer-ably maintained at or slightly above this level. Generally, the fat component need only be sufficient to supply the essential fatty acid requirement and usually constitutes less than about 1 weight percent of the dietary composition.

Animal organisms have requirements for certain anions and cations of mineral salts, and mineral requirements for certain of the various anions and cations have been established. A discussion of these requirements is set forth in the publication *Recommended Dietary Allowances* referred to hereinbefore. The ions required in greatest quantity include sodium, potassium, calcium, magnesium, and chloride ion, whereas other required ions (known as the trace elements), such as iron, manganese, cobalt, copper, molybdenum, zinc, and iodide ion, are required in lesser amounts. Minerals are provided in a natural dietary regimen primarily in the dissociated form (e.g., sodium chloride as the sodium and chloride ions), but they may also occur in the diet in covalent combination with organic molecules (e.g., cobalt in vitamin B–12 and iron in hemoglobin). Mineral levels consistent with the foregoing are preferably provided as a part of the dietary compositions employed in order to provide a composition that will meet the complete metabolic needs for the human species.

Minimum requirements have also been established for certain of those vitamins, both water- and fat-soluble, that are known to be necessary for normal physiological functions. A discussion of these requirements is also set forth in the publication *Recommended Dietary Allowances*. Vitamins occur in natural dietary regimens either as the free form or combined with other chemical moieties. The water-soluble vitamins include ascorbic acid, thiamine, riboflavin, vitamin B–6, vitamin B–12, pantothenic acid, biotin, inositol, choline, p-aminobenzoic acid; the fat-soluble vitamins include vitamin A, vitamin D, menadione, and tocopherol. As in the case of minerals, vitamins are preferably provided in amounts considered suitable in the art so that the dietary composition will meet the complete metabolic needs for the human species.

The diet composition may be produced in various forms, such as solids, powders and solutions. It is likely that it would be orally ingested as a slurry, a solution, a gel, or a pudding. It may also be otherwise parenterally administered, e.g., intravenously. The water-soluble components may be administered in an aqueous solution. The fats (or fat substitutes) and the fat-soluble vitamins may be ingested as a separate supplement or as the disperse phase of an emulsion with the aqueous solution as the continuous phase, using a suitable emulsifier. To provide human subjects with a choice of tastes for such a daily complete diet, different flavored versions should be provided. Certain flavors, particularly the citrus and other fruit flavors, are most compatible with the sweetness imparted by the high glucose content and with the other aspects of the diet composition. Two completely satisfactory flavors are orange and peach. An amount of citric acid is usually included to complement the synthetic flavoring employed to thereby provide a true fruit taste. Other organic acids, such as tartaric acid, malic acid and fumaric acid, may also be used.

The caloric values of such diets vary with the concentration of the dietary regimen, but typical liquid diets have sufficient added water to produce a caloric level of about 0.5 to 2.5 calories per milliliter. It is considered that calorie levels below about 0.5 calories per milliliter for aqueous solutions are not practicable because it would be necessary for a person to take in too large an amount of water to obtain the daily nutritional requirements. The amounts of components in Diet Formulations I and II, set forth hereinafter, are designed to each provide about 2500 calories, whereas Diet Formulation III is designed to provide about 1800 calories.

EXAMPLE I

Two patients were administered a water-soluble chemically defined diet the composition of which is shown in Table I. The fat component was administered as a separate dialy supplement. These patients were administered a natural foodstuff diet and the chemically defined diet alternately over three complete cycles for 96 days. The results revealed a lowering of the serum cholesterol level during each of the three periods that the chemical diet was administered and a return to the baseline level during each period that the natural diet was provided.

Confirmation of these results was obtained in subsequent experiments with large numbers of subjects. In one series of experiments, eighteen normal adult subjects were confined to the diet of Table I as the sole source of sustenance. Ingestion of anything else other than distilled water was prohibited. The aqueous portion of the diet was provided at four daily intervals to each experimental subject who ingested amounts sufficient to meet his subjective needs. A total of from 2100 to 3700 calories per day was consumed by each subject. Each subject ingested an amount daily that was sufficiently constant to eliminate caloric intake as a variable. The fat component was given to each subject as a separate daily supplement. Each subject followed a daily activity schedule that included regulated moderate physical exercise. Fasting blood samples were withdrawn once weekly from each patient, and the blood serum cholesterol level was measured. The tabulated results of this experiment are shown in Table IA, and FIG. 1 is a graphical representation of the mean values of cholesterol levels noted. The results of this experiment are statistically significant having a 95% confidence level.

As can be seen from Table IA and FIG. 1, during the first four weeks of the experiment, when 100 weight percent of the sugar in the diet was glucose, the serum cholesterol of each of the eighteen subjects fed this diet exhibited a progressive and dramatic drop, with the mean average for the group as a whole showing a decrease from the pre-experimental level of 227 mg. percent to 160 mg. percent after the fourth week. After the fourth week, the diet was modified by substitution of sucrose on a weight-for-weight basis for 25 weight percent of the glucose in Diet Formulation I. On being fed this otherwise identical diet, a progressive increase in the total serum cholesterol levels of each subject was observed and at the end of the seventh week of the test, the mean average had risen to 208 mg. percent. At the end of the seventh week, the diet was again modified to include 100 percent glucose as the sugar component. This was followed by a precipitous drop in the total serum cholesterol level to a mean average of 175 mg. percent at the end of the nineteenth week of the experiment. After termination of the test, all subjects were returned to natural foodstuffs and a sharp rise in serum cholesterol level of each occurred without exception, with an average mean level of 233 mg. percent shown by the group as a whole after four weeks on natural foodstuffs.

TABLE I.—DIET FORMULATION I

Amino acids:
| | | |
|---|---|---|
| L lysine·HCl | g | 3.58 |
| L-leucine | g | 3.83 |
| L-isoleucine | g | 2.42 |
| L-valine | g | 2.67 |
| L-phenylalanine | g | 1.75 |
| L-arginine·HCl | g | 2.58 |
| L-histidine·HCl·H$_2$O | g | 1.58 |
| L-methionine | g | 1.75 |
| L-alanine | g | 2.58 |
| Sodium l-aspartate | g | 6.40 |
| L-threonine | g | 2.42 |
| L-proline | g | 10.33 |
| Glycine | g | 1.67 |
| L-serine | g | 5.33 |
| L-tyrosine ethyl ester·HCl | g | 6.83 |
| L-tryptophan | g | 0.75 |
| L-glutamine | g | 9.07 |
| L-cysteine ethyl ester·HCl | g | 0.92 |

Water-soluble vitamins:
| | | |
|---|---|---|
| Thiamine·HCl | mg | 1.00 |
| Riboflavin | mg | 1.50 |
| Pyrodoxin·HCl | mg | 1.67 |
| Niacinamide | mg | 10.00 |
| Inositol | mg | 0.83 |
| d-Ca pantothenate | mg | 8.33 |
| d-Biotin | mg | 0.83 |
| Folic acid | mg | 1.67 |
| Ascorbic acid | mg | 62.50 |
| Cyanocobalamin | mcg | 1.67 |
| p-Aminobenzoic acid | mg | 416.56 |
| Choline bitartrate | mg | 231.25 |

Salts:
| | | |
|---|---|---|
| Potassium iodide | mg | 0.25 |
| Manganous acetate·4H$_2$O | mg | 18.30 |
| Zinc benzoate | mg | 2.82 |
| Cupric acetate·H$_2$O | mg | 2.50 |
| Cobaltous acetate·4H$_2$O | mg | 1.67 |
| Sodium glycerophosphate | g | 5.23 |
| or | | |
| Monocalcium fructose-1:6-diphosphate | g | *7.07–10.9 |
| Ammonium molybdate·4H$_2$O | mg | 0.42 |
| Potassium hydroxide | g | 3.97 |
| Magnesium oxide | g | 0.38 |
| Sodium chloride | g | *4.77 |
| Ferrous gluconate | g | 0.83 |
| Calcium chloride·2H$_2$O | g | 2.44 |
| Sodium benzoate | g | 1.00 |

Carbohydrates:
| | | |
|---|---|---|
| Glucose | g | 530–570 |
| Glucono-δ-lactone | g | 17.20 |

Fats and fat-soluble vitamins:
| | | |
|---|---|---|
| Ethyl linoleate | g | 2.000 |
| Vitamin A acetate | mg | 3.640 |
| Vitamin D | mg | 0.057 |
| α-Tocopherol acetate | mg | 57.29 |
| Menadione | mg | 4.58 |

Flavoring: Synthetic flavoring agents and distilled water are added in amounts compatible with optimal palatability.

*When monocalcium fructose-1:6-diphosphate is employed, the calcium chloride and sodium glycerophosphate are deleted from the formulation and the sodium chloride is appropriately adjusted upward.

TABLE IA

[Serum cholesterol levels of subjects on chemical diets (mg. percent)] [a]

| Subject code number | Weeks on chemical diets | | | | | | | | |
|---|---|---|---|---|---|---|---|---|---|
| | Phase I[b] | | | | Phase II[b] | | | Phase III[b] | |
| | 0 | 1½ | 2½ | 4 | 5 | 6 | 7 | 8 | 19 |
| 1 | 176 | | 184 | 144 | 168 | 190 | 186 | 155 | 145 |
| 2 | 178 | 160 | 146 | 120 | 178 | 190 | 213 | 155 | (c) |
| 3 | 152 | 134 | 130 | 120 | 140 | 162 | 157 | 122 | (c) |
| 4 | 210 | 148 | 138 | 134 | 150 | 176 | 160 | 131 | 117 |
| 5 | 220 | 180 | 172 | 170 | 172 | 206 | 224 | 184 | 151 |
| 6 | 232 | 160 | 162 | 155 | 168 | 167 | 180 | 138 | 133 |
| 7 | 189 | 178 | 174 | 170 | 220 | 200 | 247 | 173 | 160 |
| 8 | 189 | 123 | 146 | 142 | 154 | 160 | 164 | 131 | 143 |
| 9 | 258 | 228 | 228 | 202 | 250 | 267 | 308 | 254 | 201 |
| 10 | 240 | 148 | 176 | 146 | 158 | 188 | 180 | 168 | 151 |
| 11 | 262 | 195 | 170 | 136 | 166 | 196 | 214 | 189 | 143 |
| 12 | 354 | 269 | 226 | 260 | 260 | 294 | 318 | 290 | 214 |
| 13 | 310 | 269 | 252 | 242 | 244 | 263 | 285 | 262 | 211 |
| 14 | 223 | 136 | 160 | 114 | 130 | 144 | 158 | 148 | 120 |
| 15 | 257 | 173 | 180 | 184 | 198 | 212 | 226 | 200 | (c) |
| 16 | 155 | 120 | 120 | 124 | 128 | 128 | 140 | 108 | 105 |
| 17 | 220 | 125 | 130 | 134 | 140 | 151 | 160 | 136 | 128 |
| 18 | 262 | 225 | 170 | 180 | 184 | 209 | 226 | 200 | 140 |
| Mean | 227 | 175 | 170 | 160 | 178 | 195 | 208 | 175 | 151 |

[a] The normal range of serum cholesterol levels according to the procedure employed is 150-260 mg. percent.
[b] Carbohydrate composition of diets: Phase I, 100 weight percent glucose; Phase II, 75 weight percent glucose, 25 weight percent sucrose; Phase III 100 weight percent glucose.
[c] Subject terminated parpation prior to sample withdrawal.

EXAMPLE II

A group of 38 normal adult subjects were confined to the diet formulation shown in Table II as the sole source of sustenance. During the first four weeks of the experiment, the average serum cholesterol level for the group as a whole declined from an initial baseline value of 202 mg. percent to 135 mg. percent. This experiment, employing the diet formulation of Table II, in which the nature and levels of some of the components other than carbohydrates have been altered, represents a confirmation of the previously observed decrease in serum cholesterol levels with the diet formulation of Table I.

As is readily apparent from the above description, confining a subject to a defined diet in which glucose is the sole source of dietary sugar results in a marked lowering of serum cholesterol levels. The particular diets set forth in Tables I and II are illustrative of the type of diets usable according to this invention, and it is recognized that departure therefrom within relatively wide limits is possible as long as the diet contains components sufficient for the maintenance of normal health, and limits the source of carbohydrate to glucose, either as its pure form or as it occurs naturally as the disaccharide, maltose, or as polysaccharides of glucose in starches or dextrins.

TABLE II.—DIET FORMULATION II

Amino acids:
 L-lysine·HCl _____ g__ 3.58
 L-leucine _____ g__ 3.83
 L-isoleucine _____ g__ 2.42
 L-valine _____ g__ 2.67
 L-phenylalanine _____ g__ 2.75
 L-arginine·HCl _____ g__ 5.70
 L-histidine·HCl·H$_2$O _____ g__ 1.58
 L-methionine _____ g__ 2.48
 L-alanine _____ g__ 2.58
 L-aspartic acid _____ g__ 5.50
 L-threonine _____ g__ 2.42
 L-proline _____ g__ 3.42
 Glycine _____ g__ 4.20
 L-serine _____ g__ 1.78
 L-tyrosine ethyl ester·HCl _____ g__ 4.10
 L-tryptophan _____ g__ 0.75
 L-glutamine _____ g__ 9.15
Vitamins:
 Thiamine·HCl _____ mg__ 1.00
 Riboflavin _____ mg__ 1.50
 Pyrodoxin·HCl _____ mg__ 1.67
 Niacinamide _____ mg__ 10.00
 Inositol _____ mg__ 0.83
 d-Ca pantothenate _____ mg__ 8.33
 d-Biotin _____ mg__ 0.83
 Folic acid _____ mg__ 1.67
 Ascorbic acid _____ mg__ 62.50
 Cyanocobalamin _____ mcg__ 1.67
 p-Aminobenzoic acid _____ mg__ 416.56
 Choline bitartrate _____ mg__ 231.25
Salts:
 Potassium iodide _____ mg__ 0.25
 Manganous acetate·4H$_2$O _____ mg__ 18.30
 Zinc chloride _____ mg__ 1.25
 Cupric acetate·H$_2$O _____ mg__ 2.50
 Cobaltous acetate·4H$_2$O _____ mg__ 1.67
 Sodium glycerophosphate _____ g__ 5.23
 Potassium sorbate _____ g__ 1.00
 Ammonium molybdate·4H$_2$O _____ mg__ 0.42
 Potassium hydroxide _____ g__ 4.00
 Magnesium oxide _____ g__ 0.38
 Sodium hydroxide _____ g__ 1.68
 Ferrous ammonium sulfate·6H$_2$O ____ g__ 0.68
 Calcium chloride·2H$_2$O _____ g__ 2.44
 Sodium chloride _____ g__ 5.33
Carbohydrates:
 Glucose _____ g__ 570
 Glucono-δ-lactone _____ g__ 17.20

Fats and fat-soluble vitamins:
 Ethyl linoleate _____ g__ 2.000
 Vitamin A acetate _____ mg__ 3.640
 Vitamin D _____ mg__ 0.057
 α-Tocopherol acetate _____ mg__ 57.29
 Menadione _____ mg__ 4.58
Flavoring: Synthetic flavoring agents and distilled water are added in amounts compatible with optimal palatability.

EXAMPLE III

Another group of adult subjects are confined to the diet formulation shown in Table III. During the first four weeks, a decline in the average serum cholesterol level of the group as a whole similar to that experienced in Example II is witnessed. After the fourth week, the diet is modified by substitution of sucrose, on a weight-for-weight basis, for 25 weight percent of the glucose in Diet Formulation III. A progressive increase in the total serum cholesterol levels of each subject is observed. At the end of the seventh week, the subjects are returned to the original diet formulation containing 100 percent glucose and no sucrose. A substantial drop in the blood serum cholesterol levels of each subject is again observed.

TABLE III.—DIET FORMULATION III

Amino acids:
 L-lysine·HCl _____ g__ 2.45
 L-leucine _____ g__ 2.61
 L-isoleucine _____ g__ 1.65
 L-valine _____ g__ 1.82
 L-phenylalanine _____ g__ 1.88
 L-arginine·HCl _____ g__ 3.89
 L-histidine·HCl·H$_2$O _____ g__ 1.08
 L-methionine _____ g__ 1.69
 L-alanine _____ g__ 1.76
 L-aspartic acid _____ g__ 3.75
 L-threonine _____ g__ 1.65
 L-proline _____ g__ 2.35
 Glycine _____ g__ 2.87
 L-serine _____ g__ 1.21
 L-tyrosine ethyl ester·HCl _____ g__ 2.80
 L-tryptophan _____ g__ 0.51
 L-glutamine _____ g__ 6.19
Water-soluble vitamins:
 Thiamine·HCl _____ mg__ 1.20
 Riboflavin phosphate, NA salt _____ mg__ 1.64
 Pyridoxine·HCl _____ mg__ 2.00
 Niacinamide _____ mg__ 13.3
 Inositol _____ mg__ 116.5
 d-Calcium pantothenate _____ mg__ 10.0
 d-Biotin _____ mg__ 0.20
 Folic acid _____ mg__ 1.18
 Ascorbic acid _____ mg__ 70.0
 Cyanocobalamin _____ mcg__ 5.0
 p-Aminobenzoic acid, K salt _____ mg__ 354.9
 Choline chloride _____ mg__ 85.0
Minerals:
 Potassium chloride _____ g__ 2.33
 Potassium hydroxide _____ g__ 1.27
 Sodium chloride _____ g__ 1.21
 Sodium hydroxide _____ g__ 1.13
 Calcium chloride _____ g__ 2.93
 Citric acid _____ g__ 12.11
 Sorbic acid _____ g__ 0.90
 Sodium glycerophosphate·5½H$_2$O ___ g__ 8.13
 Magnesium oxide _____ g__ 0.258
 Potassium iodide _____ mg__ 0.190
 Manganous acetate·4H$_2$O _____ mg__ 12.49
 Cupric acetate·H$_2$O _____ mg__ 6.12
 Acetic acid _____ mg__ 5.95
 Zinc chloride _____ mg__ 0.85
 Ferrous ammonium sulfate·6H$_2$O ___ mg__ 70.0
 Cobaltous acetate·4H$_2$O _____ mg__ 1.18
 Ammonium molybdate·4H$_2$O _____ mg__ 0.29

Carbohydrates:
- Glucose _____ g__ 400.5
- Glucono-δ-lactone _____ g__ 6.31

Fat and fat-soluble vitamins and emulsifier:
- Safflower oil _____ g__ 1.33
- Vitamin A acetate _____ mg__ 1.72
- Vitamin $D_2$ _____ mcg__ 10.0
- Menadione _____ mg__ 3.22
- α-Tocopherol acetate _____ mg__ 20.0
- Polyoxyethylene sorbitan monocoleate ___ mg__ 66.7

Flavoring: Synthetic flavoring agents are added.

EXAMPLE IV

A further group of adult subjects are confined to a diet formulation the same as that shown in Table III except that 50 grams of casein are substituted for the amino acid mixture, and 400.5 grams of maltose is substituted for the glucose. During the first four weeks, a decline in the average serum cholesterol level of the group as a whole similar to that experienced in Example II is witnessed.

EXAMPLE V

Still another group of adult subjects are confined to a diet formulation the same as that shown in Table III, except that 50 grams of casein hydroylsate plus 1 gram of L-methionine and 0.6 gram of L-tryptophan are substituted for the amino acid mixture set forth therein and about 3.6 grams of purified corn oil are added. During the first four weeks, a decline in the average serum cholesterol level of the group as a whole similar to that experienced in Example II is witnessed. After the fourth week, the diet is modified by substitution of sucrose on a weight-for-weight basis for 25 weight percent of the glucose. A progressive increase in the total serum cholesterol levels of each subject is observed. At the end of the seventh week, the subjects are returned to the original diet formulation containing 100 percent glucose and no sucrose. A substantial drop in the blood serum cholesterol levels of each subject is again observed.

EXAMPLE VI

A still further group of adult subjects are confined to a diet formulation the same as that shown in Table III, except that 55 grams of peptones obtained by the partial hydrolysis of soy protein are substituted for the amino acid mixture and 400.5 grams of dextrins are substituted for the glucose. During the first four weeks, a decline in the average serum cholesterol level of the group as a whole similar to that experienced in Example II is witnessed.

In summary, this invention involves the discovery that if glucose in its mono, di, or polysaccharide form is the primary source of carbohydrate in a defined diet that is the sole source of sustenance for the human species (and thus is adequate to maintain normal human physiological function), a substantial reduction in blood serum cholesterol level can be obtained by confining a subject to such a diet. When substantial amounts of other sugars, such as sucrose, are included in the diet, no such lowering is noted. It is to be expected that, as a diet that contains a given level of sucrose would be modified by replacing the sucrose with glucose, a decrease in serum cholesterol levels would be observed before all the sucrose is replaced; however, the maximal effect on cholesterol level should be obtained when all of the sucrose is replaced. Accordingly, it is preferred to utilize a diet containing only glucose although low levels of sucrose can be tolerated without departing from the scope of this invention.

As the examples show, the effect of lowering the serum cholesterol level is not dependent upon a specific mixture of amino acids, as diet compositions utilizing protein, peptones and protein hydrolysates function to achieve the desired effect. Likewise, employment of particular minerals and vitamins in amounts well known in the art is not considered to affect the cholesterol lowering, as evidenced by the fact that, even when these components remain unchanged, the substitution of 25 percent sucrose negates the cholesterol-lowering effect and causes an actual increase.

While this invention has been described with respect to certain specific embodiments thereof, these embodiments are included for the purpose of illustration and should not be construed as limiting the invention because various modifications to the dietary formulations can be made as would be apparent to one ordinarily skilled in this art.

Various of the features of the invention are set forth in the claims which follow:

What is claimed is:

1. A method for lowering the blood serum cholesterol level of a human in need of such therapy, which method consists essentially of administering to the human as the sole source of sustenance a defined diet composition consisting essentially of vitamins, minerals, a source of amino acids, a source of essential fatty acid and a carbohydrate component selected from the group consisting of glucose, maltose, polysaccharides of glucose, and mixtures thereof.

2. A method in accordance with Claim 1 wherein said source of amino acids is selected from the group consisting of proteins, protein hydrolysates, peptones, peptides, free amino acids, and mixtures thereof.

3. A method in accordance with Claim 1 wherein said source of essential fatty acid consists essentially of glycerol esters of fatty acids or simple esters of fatty acids or mixtures thereof.

4. A method in accordance with Claim 3 wherein said source of essential fatty acid is present in the defined diet composition in an amount not greater than about one percent by weight.

5. A method in accordance with Claim 1 wherein said defined diet composition is in the form of an emulsion with said carbohydrate, said minerals, the water-soluble members of said vitamins and said source of amino acids being present in an aqueous continuous phase and said source of essential fat and the fat-soluble members of said vitamins being present as a disperse phase.

6. A method in accordance with Claim 1 wherein said defined diet composition is a chemically defined diet composition.

7. A method in accordance with Claim 6 wherein said source of amino acids consists essentially of free amino acids.

8. A method in accordance with Claim 7 wherein said carbohydrate component consists essentially of glucose.

References Cited

UNITED STATES PATENTS 3,080,234    3/1963    Jarowski _____ 99—14

OTHER REFERENCES

Gnudi et al.: Chem. Abst., vol. 56 (1962), p. 1871e.
Farnell et al.: Chem. Abst., vol. 57 (1962), p. 7707f.
Winitz et al.: Chem. Abst., vol. 62 (1965), p. 6860d (abst. of 1964).
Macdonald: Chem. Abst., vol. 63 (1965), p. 18726g.
Modern Drug Encyclopedia, 9th edit. (1963), pp. 482, 744 and 745.
Physicians Desk Reference (1962), pp. 986–987.
Greenstein et al.: Chemistry of the Amino Acids, vol. I, John Wiley & Sons (1961), pp. 384–389.
Macdonald: Chem. Abst., vol. 62 (1965), p. 6867h (abstract of 1964 article).
Gnudi et al.: Chem. Abst., vol. 55 (1961), p. 3755d.

SAM ROSEN, Primary Examiner

U.S. Cl. X.R.

424—177; 426—2, 72, 74, 200